March 20, 1962  F. HALWARD  3,025,570
PLASTIC MOLD BASE AND UNIT DIES
Filed March 2, 1959  3 Sheets-Sheet 1

INVENTOR.
FOLKE HALWARD
BY Robert G. Slowan
ATTORNEY

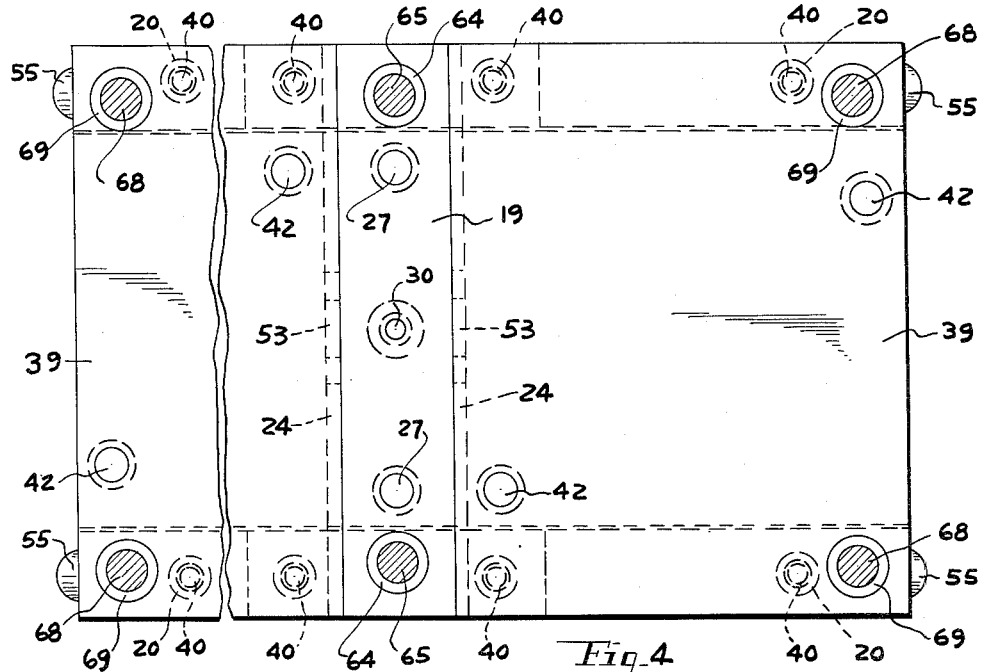
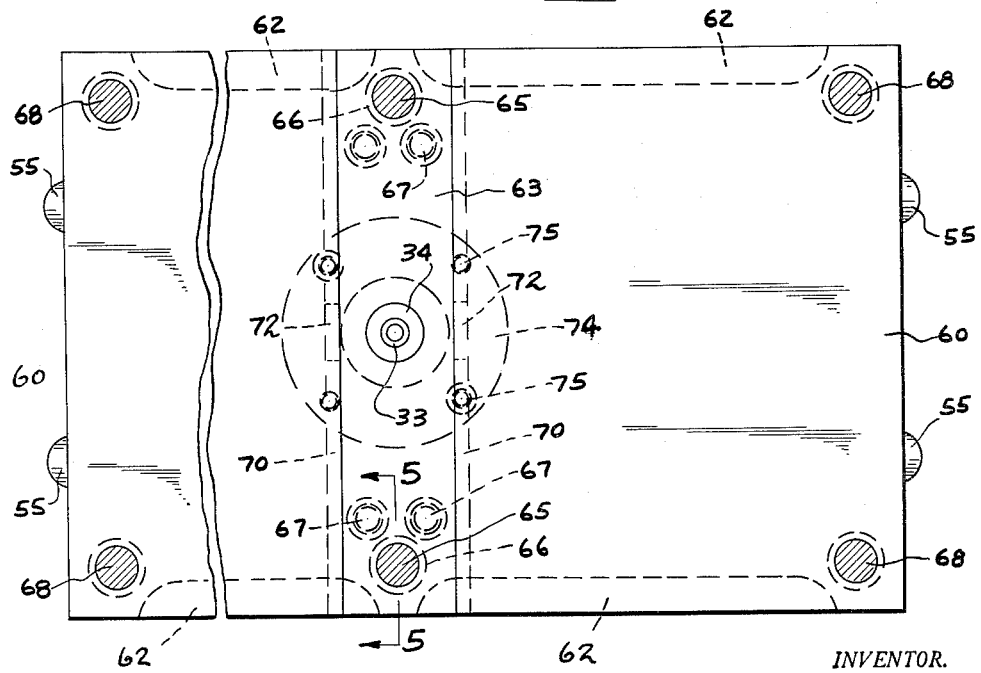

March 20, 1962  F. HALWARD  3,025,570
PLASTIC MOLD BASE AND UNIT DIES
Filed March 2, 1959  3 Sheets-Sheet 3
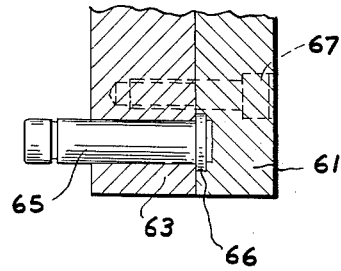
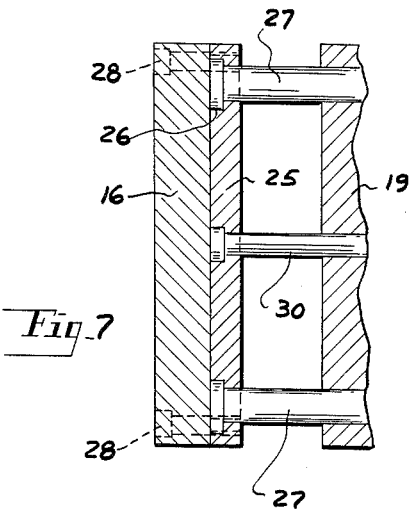
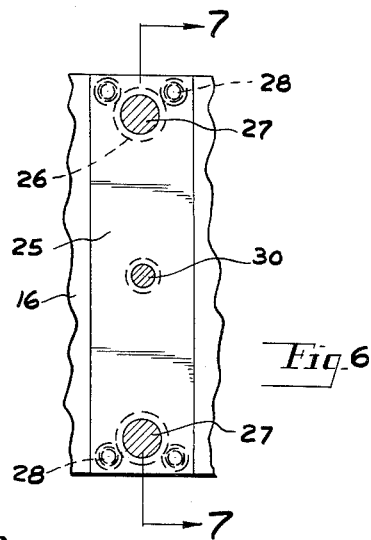
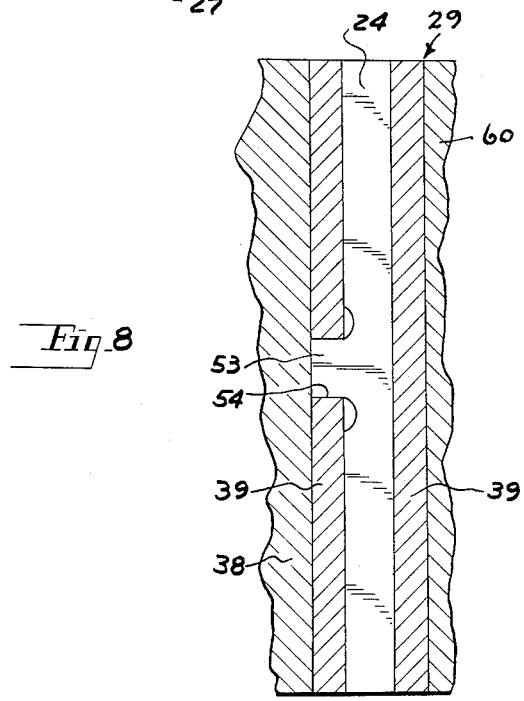
INVENTOR.
FOLKE HALWARD
BY
Robert A. Sloman
ATTORNEY United States Patent Office 3,025,570
Patented Mar. 20, 1962

3,025,570
PLASTIC MOLD BASE AND UNIT DIES
Folke Halward, Southfield Township, Mich., assignor, by mesne assignments, to D-M-E Corporation, Detroit, Mich., a corporation of Michigan
Filed Mar. 2, 1959, Ser. No. 796,532
6 Claims. (Cl. 18—42)

This invention relates to injection plastic molding and more particularly to a master mold base incorporating removable and interchangeable unit molds.

It is the object of this invention to provide a mold wherein there is provided a master holder incorporating a master ejector plate and with provision for the removable insertion and interlocking projection of a pair of unit molds and their securing within the master holder.

It is the further object to provide a novel means of interlocking and securing the unit molds within the master holder.

It is another object to provide a unit mold, which consists of a backup plate with attached cavity retainer plate and an associated ejector plate carrying return pins and ejector pins initially assembled with respect to and slidable through corresponding apertures formed in said backup plate and cavity retainer plate and wherein the assembled ejector pins are located with respect to prelocated cavities formed within the cavity retainer plate.

It is contemplated that all of these parts as a unit may be removably mounted upon the master holder and wherein the individual ejector plates of a pair of unit molds will be operatively engaged by the master ejector plate.

It is still another object to provide upon the master holder a center block with retaining means for interlockingly receiving and securing the complementary stationary cavity retainer plates for cooperation with the first mentioned cavity retainer plates.

It is another object to provide a novel means of securing these additional cavity retainer plates with respect to the aforementioned center block.

These and other objects will be seen from the following specification and claims in conjunction with the appended drawing in which:

FIG. 3 is a partially broken away section taken on line 3—3 of FIG. 1.

FIG. 4 is a partially broken away section taken on line 4—4 of FIG. 1.

FIG. 5 is a fragmentary section taken on line 5—5 of FIG. 3.

FIG. 6 is a fragmentary elevational section taken on line 6—6 of FIG. 1.

FIG. 7 is a fragmentary section taken on line 7—7 of FIG. 6.

FIG. 8 is a fragmentary additional section taken on line 8—8 of FIG. 1.

It will be understood that the above drawings illustrate merely a preferred embodiment of the invention and that other embodiments are contemplated with the scope of the claims hereafter set forth.

Figure 2:
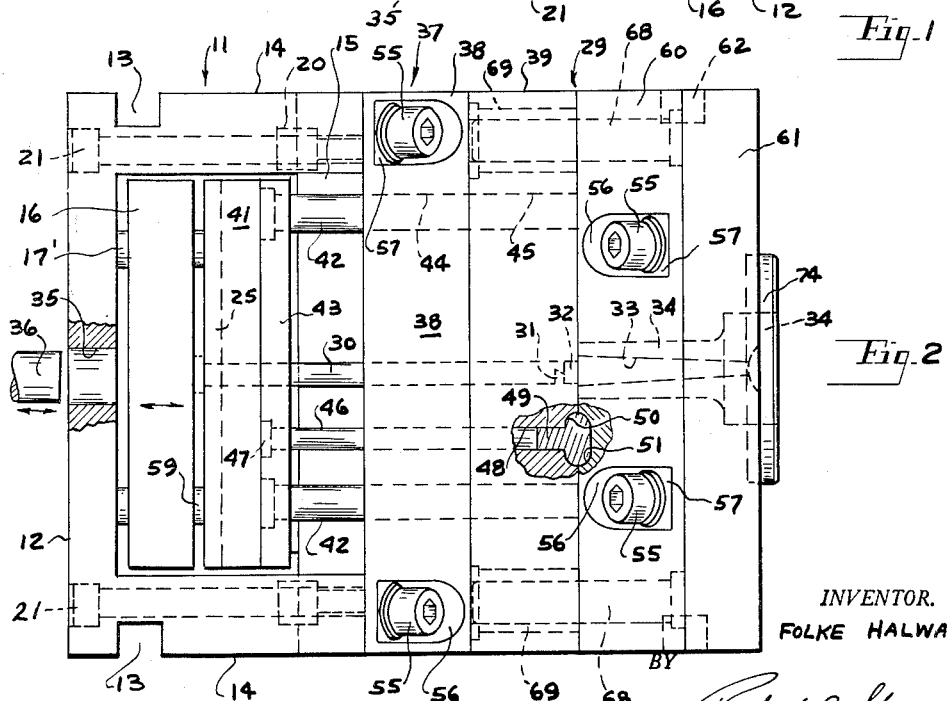
FIG. 2 is a right side elevational view thereof, partially broken away and sectioned for illustration.

Referring to the drawing, the present mold base adapted for ejection plastic molding, for illustration, includes a master holder 11, FIG. 2, having an upright rectangular anchor plate 12 adapted for securing to the reciprocal part of a molding machine. The master holder includes the rectangular top and bottom parallels or plates 14 fixedly secured to said anchor plate defining an ejector box having ejector cavity 15. Rectangular master ejector plate 16 is loosely arranged in an upright position within cavity 15 and is adapted for reciprocal longitudinal movements therein as hereafter described. Slots 13 facilitate clamping to the molding machine.

A plurality of spaced rest buttons 17' are fixedly secured, preferably to one side of ejector plate 16 adapted to cooperatively bear against the interior surface of plate 12 limiting rearward movements of said ejector plate in said ejector box.

Rectangular slots 17 are formed through the parallels 14 in vertical registry and cooperatively receive wings 18 which project from opposite sides at the top and bottom of anchor block 19. Said block extends through its full height between parallels 14 and is fixedly secured thereto by the four bolts 21.

Tubular dowels extend into corresponding openings in wings 18 and parallels 14 for achieving correct registry therebetween. Fastening bolts 21 retained with respect to anchor plate 12 and extend horizontally through parallels 14, through dowels 20 and threadedly engage wings 18 at points 22. This establishes a fixed relationship between anchor block 19, parallels 14 and anchor plate 12.

The forward upright edges 23 of wings 18 provide stops in cooperation with the upright surfaces on opposite sides of block 19 to cooperatively receive backup plates 38 which form a part of the present unit molds 37.

A pair of upright oppositely extending keys 24 extend from the sides of anchor block 19 and are adapted to cooperatively project within corresponding slots 52 formed in the upright edges of cavity retainer plates 39.

Plates 39 form a part of the unit mold and are connected with backup plate 38 by a plurality of tubular dowels 20 and fixedly secured thereto by corresponding bolts 40 retained within anchor plate 38 and threaded into the corresponding cavity plate 39. Said bolts extend through dowels 20.

Each of the present unit molds includes its own ejector plate 41 provided with a pair of diagonally arranged return pins 42. These return pins extend at right angles to ejector plate 41 and their enlarged heads are anchored to said ejector plate by locking plate 43 which is suitably secured as by screws to said ejector plate.

Return pins 42 movably extend through corresponding apertures 44 and 45 in backup plate 38 and cavity plate 39 respectively. The outer flat ends of said return pins normally register with the parting line 29 between cavity plate 39 and the stationary cavity plate 60 adjacent thereto.

The required appropriate number of ejector pins 46 are likewise anchored at 47 to ejector plate 41 and slidably extend through corresponding apertures in backup plate 39 and apertures 48 in cavity plate 39 adapted for registry with the plastic molded article 49 defined by the cooperating cavities 50 and 51 as shown in FIG. 2. Cavity 50 is formed or inserted within cavity plate 39 and corresponding cavity 51 is formed or inserted within stationary cavity plate 60.

In the normal operation of the molding device after the injection of the molding substance within the cavities and the congealing thereof into the molded articles 49, anchor plate 12 is mechanically withdrawn by the molding machine with respect to parting line 29 which corresponds to the front face of cavity plate 60 fixedly anchored to a stationary portion of the molding machine.

This action withdraws the molded article 49 from cavity 51. By a conventional operation of the molding machine the plunger 36 is projected forwardly through aperture 35 in anchor plate 12 for operative engagement with master ejector plate 16. This effects a corresponding relative forward movement of the respective ejector plates 41 of each of the unit molds upon opposite sides of anchor block 19 and forward projection of pins 46 for ejecting the molded articles 49 from cavities 50.

During this operation the return pins 42 will project at their free ends beyond the end face of cavity plate 39. When the mold base assembly is returned into registry with parting line 29, return pins 42 engage plates 60 and are mechanically projected rearwardly for returning the respective ejector plates 41 and master ejector plate 16 to the inoperative position shown in FIG. 2.

A plurality of buttons 59 are preferably secured to the rear surfaces of the ejector plate 41 of each unit mold for normally spacing said plates forwardly of the master ejector plate and for returning said master ejector plate to inoperative position.

Each of the unit dies includes a cavity plate 39 which may have formed therein cavities 50 shown in FIG. 2, or have die inserts therein. These are preformed and their location determined by the mold maker.

The unit die, including cavity plate 39, backup plate 38, ejector plate 41—43, return pins 42 and ejector pins 46 are projected as a unit into master holder 11. The master holder includes anchor plate 12, parallels 14, master ejector plate 16, and the center section defined by anchor block 19, and center block 63.

Figure 1:
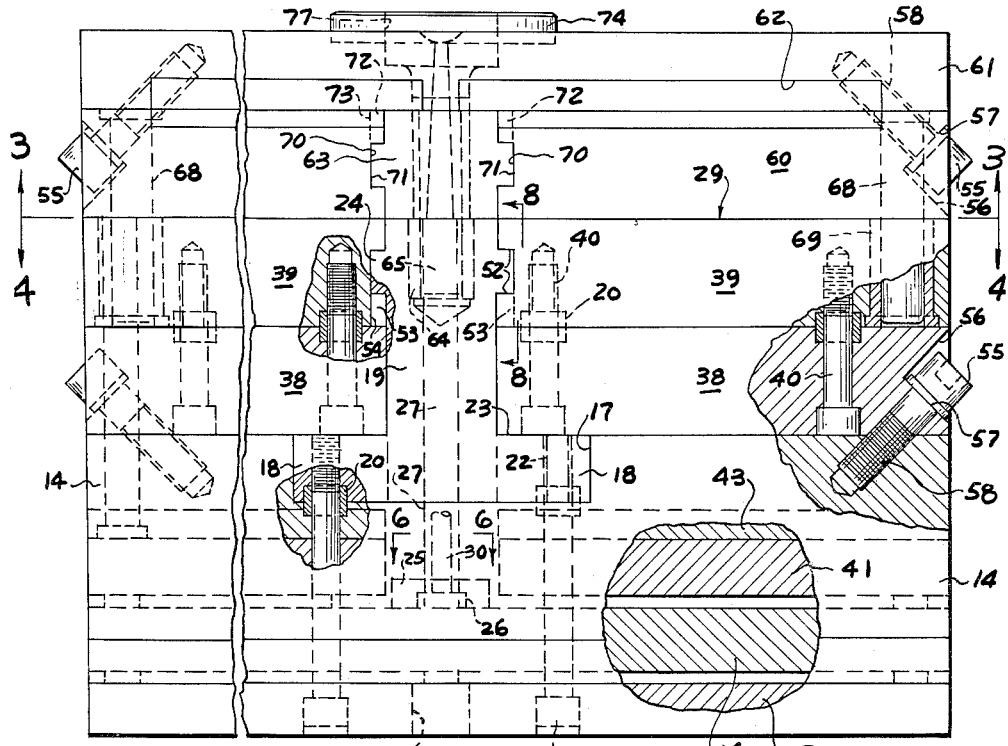
FIG. 1 is a partially broken away plan view of the present master holder and unit molds.

The above described unit die is projected laterally into said master holder so that the ejector plate 41 nests within ejector cavity 15, of FIG. 2. At the same time backup plate 38 abuts the forward upright edges of parallels 14 and its inner upright corner engages anchor block wings 18 at 23 as well as the inner upright surface of anchor block 19 as illustrated in FIG. 1.

Cavity plate 39 initially secured at 40 to backup plate 38 is simultaneously projected into the master holder so that its inner upright groove 52 interlockingly receives the outwardly projected upright key 24 of anchor block 19. This serves to locate cavity plate 39 against inward or outward movement longitudinally of the master holder and with respect to anchor block 19.

Means are also provided for restraining cavity plate 39 against relative vertical movements with respect to anchor block 19. For this purpose and from each of the keys 24 of said anchor block on opposite sides thereof there is provided a centrally arranged key 53, best illustrated in FIG. 8. This key lies at right angles to the length of key 24. Key 53 is received within a similarly shaped slot 54, FIG. 8 formed in the inner upright end face of cavity plate 39. Upon assembly of cavity plate 39 with respect to anchor block 19 there is thus established a fixed relationship between said cavity plate, anchor block and the master holder.

The above described die unit is fixedly secured in its assembled position by a pair of socket headed screws 55 arranged in vertical alignment which extend angularly inward at a preferred angle of 45-degrees through edge portions of back up plate 38. As shown in FIG. 1, 90-degree notches 56—57 are formed in the end walls of the respective backup plates 39 so that the heads of screws 55 operatively engage surfaces 57, whereas the shanks of said screws threadedly engage the respective top and bottom parallels 14 as indicated in FIG. 2.

There is thus defined a novel interlock between the unit die and the master holder and wherein the standard screws 55 exert forces in two directions, i.e., one for clamping backup plate 38 against parallels 14 and the other to forcefully clamp the backup plate against the center section or anchor block 19. This completes the assembly of the unit die within the master holder.

A similar unit die is arranged upon the opposite side of anchor block 19 and is similarly secured in position by an additional pair of angular screws 55, as shown in FIG. 1.

The present master holder includes a stationary anchor plate 61 adapted for securing upon the stationary part of an injection molding machine, for illustration. Said anchor plate is parallel to anchor plate 12. Upright center block 63 is positioned upon the forward side of plate 61 and is secured thereto by a plurality of screws 67 as illustrated in FIGS. 3 and 5.

Elongated slots 62 are formed in the top and bottom edges of anchor plate 61 providing means for clamping said anchor plate to the stationary part of the molding machine employed.

Vertically aligned leader pins 65 are anchored at 66 within plate 61, extend through center block 63 and project therefrom. When cavity plates 39 are mechanically returned to the parting line 29 for registry with cavity plates 60, leader pins 65 guidably project into bushings 64 secured within anchor block 19 as shown in FIGS. 1 and 4.

As shown fragmentarily in FIG. 2, cavity plate 60 has formed therein a series of cavities 51. These may be in the form of inserts. These cavities are designed for exact cooperative registry with cavities 50 respectively in cavity plate 39. Additional leader pins 68 are anchored adjacent the corners of cavity plates 60 and project therefrom for cooperative registry within additional bushings 69 anchored within corner portions of movable cavity plates 39. These leader pins cooperate with leader pins 65 in assuring the correct registry between cavity plates 39 and 60. Laterally extending keys 70 project from opposite sides of center block 63 and are adapted to receive the upright respective grooves 71 formed in the upright internal edges of cavity plates 60 to define the interlock shown in FIG. 1.

Additional keys 72 extend rearwardly intermediate the top and bottom of block 63 from keys 70 at right angles thereto and are adapted to nest within and be cooperatively received by similarly shaped slots 73 formed in the inner upright edges of cavity plates 60. Therefore the same type of interlock is established between cavity plates 60 and center block 63 as above described with respect to plates 39 and anchor block 19.

Accordingly the cavity plates 60 are immovably assembled in interlock relation with center block 63. The plates are fixedly secured thereto and with respect to anchor plate 61 by an additional pair of vertically aligned angular screws 55, FIGS. 1 and 2. Simialr 90-degree notches 56—57 are formed within side portions of plates 60 to cooperatively receive the respective angular screws 55 which extend angularly through plates 60 and threadedly engage anchor plate 61 at points 58, FIG. 1.

A conventional sprue bushing 34 is projected into and through anchor plate 61 and center block 63 as shown in FIGS. 1 and 2, and includes a tapered bore 33 through which molten injection plastic material is projected to parting line 29. At that point it is distributed by conventional gating to the interiors of the respective cooperating cavities 50—51 for producing the molded articles 49.

The rear end of sprue bushing 34 projects outwardly from anchor plate 61. A conventional suitably apertured locator ring 74 is mounted at 77 over sprue bushing 34 and secured to anchor plate 61 by screws 75, FIG. 3. Said ring cooperatively receives the nozzle which delivers the molten plastic material to said sprue bushing.

As above described, sprue puller pin 30 is secured to the master ejector plate 16, FIGS. 1 and 2 and slidably extends through anchor block 19 in axial alignment with the sprue bushing. Said sprue puller has an undercut end portion 31 which is arranged inwardly of the central aperture 32 providing a means of interlock with the sprue developed during the molding operation.

Accordingly upon separation of the cavity plates after the molding operation, the solidified sprue within tapered passage 33 is withdrawn therefrom and is broken off in a conventional manner.

Having described my invention, reference should now be had to the following claims.

I claim:

1. In combination, a hollow ejector housing adapted for securing to a reciprocal part of an injection plastic molding machine, and including an upright anchor plate and parallel top and bottom plates secured to and projecting forwardly thereof, an upright master ejector plate loosely positioned within said housing parallel to and forwardly of said anchor plate between said top and bottom plates for reciprocal movements in said housing, an upright anchor block spaced forwardly from said master ejector plate centrally of said housing extending between said top and bottom plates and secured thereto, means slidably mounting said master ejector plate on said block, said means including a pair of vertically spaced horizontally disposed return pins joined at their one ends to said master ejector plate, slidably extending longitudinally through said anchor block, and a pair of unit dies respectively mounted on said housing on opposite sides of said anchor block, each unit die comprising an upright backup plate bearing against said top and bottom plates and against said anchor block, an upright cavity plate fixedly secured to said backup plate, interlocking means between inner portions of said cavity plate and block preventing relative longitudinal and transverse movements therebetween, said interlocking means including a cooperating slot and projection extending in one direction and a cooperating key and slot extending in a direction at right angles thereto, clamping screws securing outer portions of said backup plate to said top and bottom plates respectively, and an upright ejector plate spaced rearwardly of and slidably mounted on said backup plate and bearing against said master ejector plate for reciprocal movements therewith, the mounting of said latter ejector plate including a pair of vertically spaced horizontally disposed return pins joined at their one ends to said ejector plate, slidably and supportably extending longitudinally through said backup plate and cavity plates, and movable means adapted to project said master ejector plate in one direction effecting corresponding movements of said ejector plates in said unit dies respectively, return movements of said ejector plates effecting corresponding return movement of said master ejector plate.

2. The combination ejector housing and unit dies of claim 1, said cooperating slot and projection including upright outwardly projecting flanges on opposite sides of said anchor block received within corresponding slots within said cavity plates, said keys respectively extending at right angles to said flanges received within corresponding slots in said cavity plates.

3. The combination ejector housing and unit dies in claim 1, said clamping screws anchored to said backup plate extending inward at an acuate angle retainingly engaging said top and bottom plates respectively, and inwardly biasing said backup plate and cavity plate against said anchor block.

4. The combintion defined in claim 1, there being a pair of vertically spaced right angle notches formed in said backup plates, the inner wall bounding said notches extending at an acute angle to the end face of said backup plate, said clamping screws bearing against said inner wall extending inwardly at an acute angle of approximately 45 degrees and retainingly engaging said top and bottom plates respectively.

5. The combination ejector housing and unit dies of claim 1, a second upright anchor plate adapted to be secured to a stationary part of an injection plastic molding machine, an upright center block secured to said latter anchor plate centrally thereof in longitudinal registry with said anchor block, a pair of transversely aligned fixed cavity plates in cooperating opposed longitudinal registry respectively with the cavity plates of each unit die bearing against said latter anchor plate and center block, interlocking means between inner portions of said fixed cavity plates and center block preventing relative longitudinal and transverse movements therebetween, and clamping screws securing outer portions of said fixed cavity plates to said latter anchor plate, the interlocking means between said center block and fixed cavity plates including cooperating slots and projections respectively extending in one direction and cooperating keys and slots respectively extending in a direction at right angles thereto.

6. The combination ejector housing and unit dies of claim 1, a second upright anchor plate adapted to be secured to a stationary part of an injection plastic molding machine, an upright center block secured to said latter anchor plate centrally thereof in longitudinal registry with said anchor block, a pair of transversely aligned fixed cavity plates in cooperating opposed longitudinal registry respectively with the cavity plates of each unit die bearing against said latter anchor plate and center block, interlocking means between inner portions of said fixed cavity plates and center block preventing relative longitudinal and transverse movements therebetween, and clamping screws sceuring the outer portions of said fixed cavity plates to said latter anchor plate, there being a pair of vertically spaced right angular notches formed in outer portions of said fixed cavity plates, the inner walls bounding said notches extending at an angle of approximately 45-degrees to the end faces of said fixed cavity plates respectively, said clamping screws bearing against said inner walls respectively and extending inward at the angle of approximately 45-degrees through said fixed cavity plates and threadedly and retainingly engaging said latter anchor plate simultaneously biasing said latter cavity plates into snug engagement with said center block.

References Cited in the file of this patent

UNITED STATES PATENTS

| | | |
|---|---|---|
| 793,895 | Monroe | July 4, 1905 |
| 1,868,959 | Willshaw | July 26, 1932 |
| 2,574,223 | Nichols | Nov. 6, 1951 |
| 2,587,070 | Spillman | Feb. 26, 1952 |
| 2,645,815 | Quarnstrom | July 21, 1953 |
| 2,874,409 | Quarnstrom | Feb. 24, 1959 |
| 2,956,321 | Halword | Oct. 18, 1960 |